Patented Nov. 11, 1930

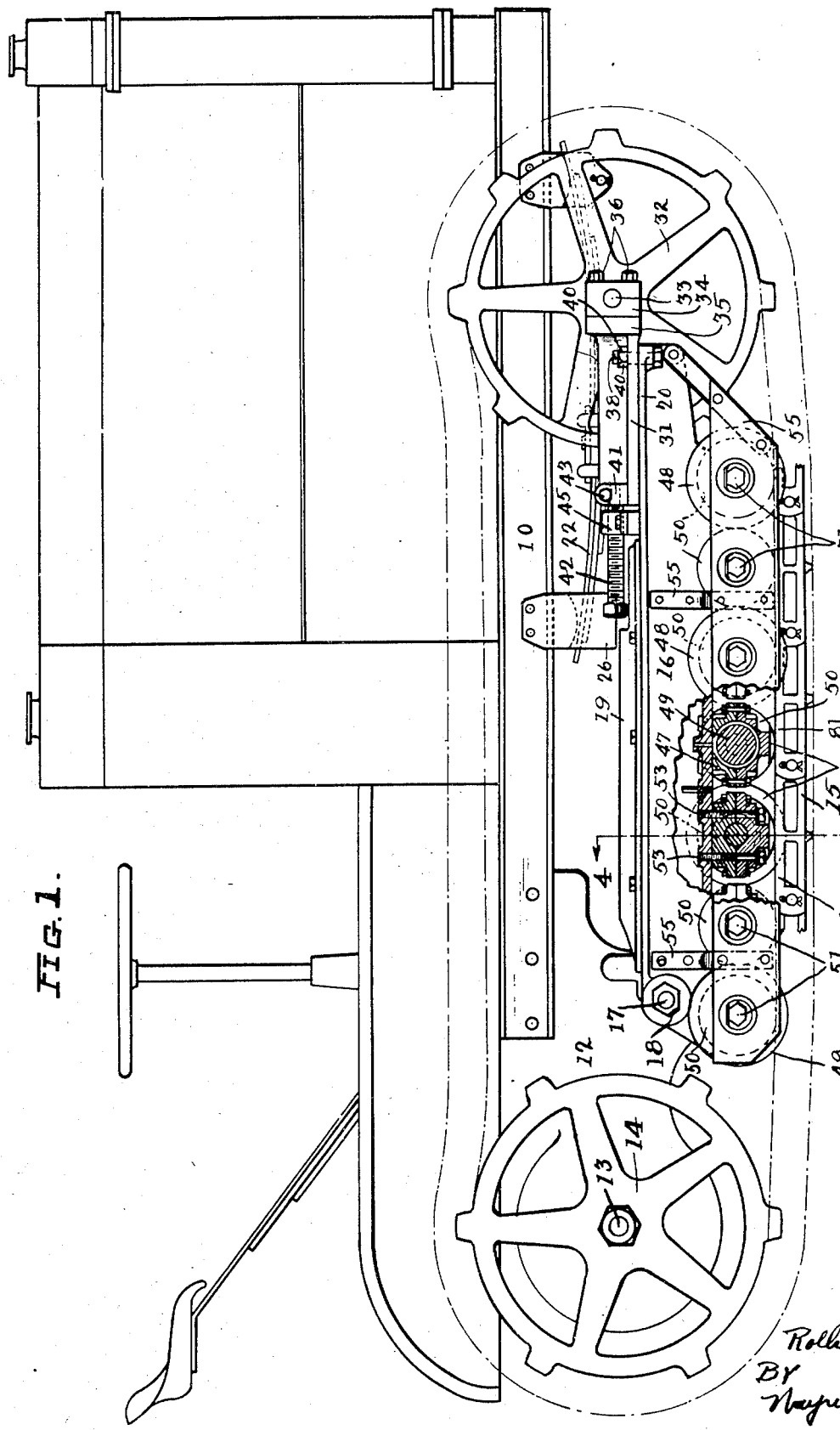

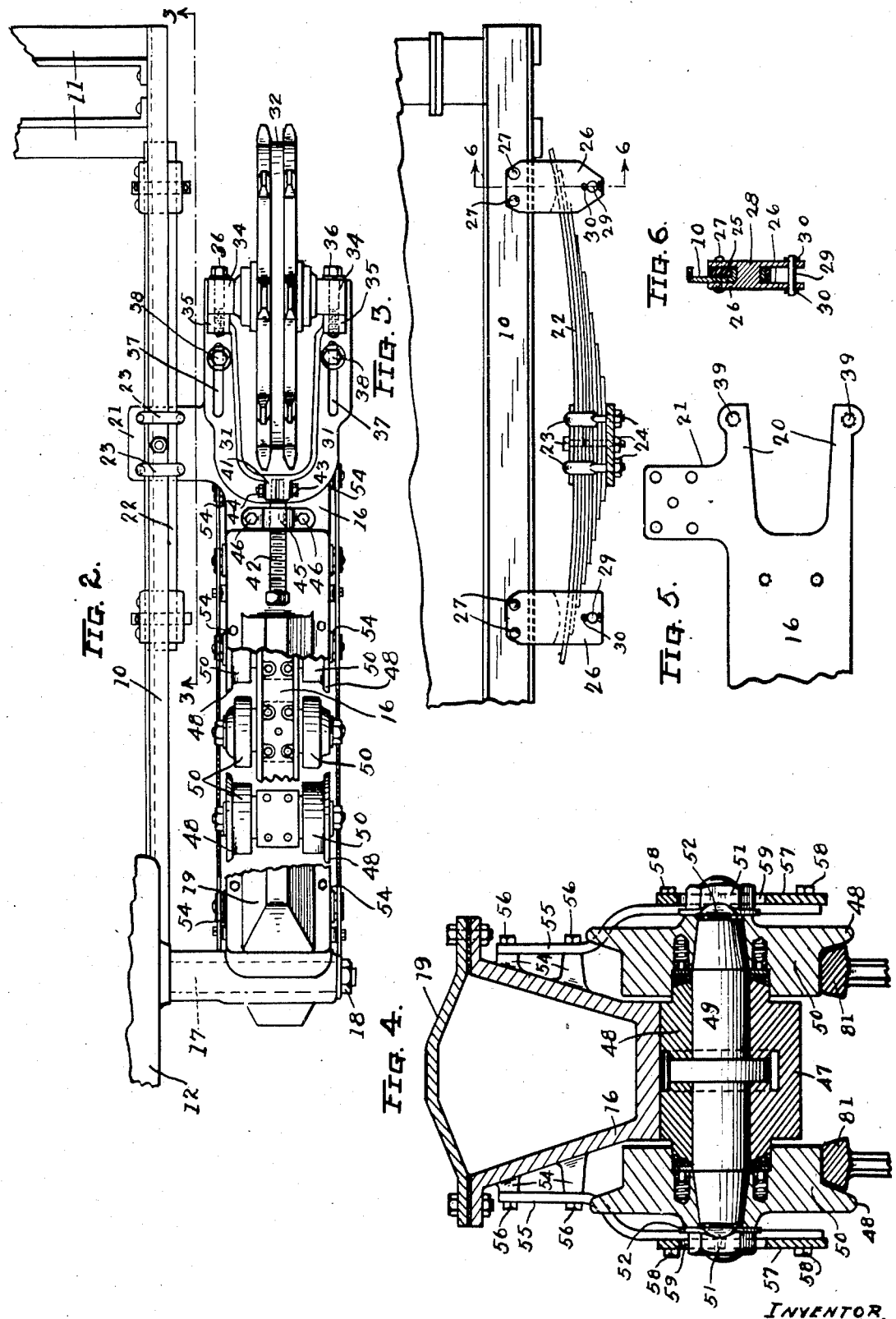

1,781,486

UNITED STATES PATENT OFFICE

ROLLIN H. WHITE, OF CLEVELAND HEIGHTS, OHIO

TRACKLAYING TRACTOR

Application filed August 6, 1925. Serial No. 48,552.

This invention relates to tractors, and more particularly to tractors of the track-laying type.

An object of my invention is to provide a structure in which the bearing rollers and tracks are so arranged and related that the ground run of the articulated endless tracks will not buckle.

A further object of my invention is to provide a truck frame structure for tracklaying tractors which is guarded to prevent trash from becoming entangled with the bearings of the weight supporting track rollers and the track members.

Another object of my invention is to provide a unitary front idler sprocket assembly which can be readily attached and adjusted upon the forward end of a truck frame supporting a track-laying tractor, so that the tension of the endless track can be adjusted as desired without laterally misaligning the idler sprocket.

These and other objects will appear in the following specification.

In the accompanying drawings, Figure 1 is a side elevation of a track-laying tractor embodying my invention; Fig. 2 is a top plan view of one side of the tractor, a portion of the truck frame being in section to show the rollers; Fig. 3 is a sectional view taken on line 3—3 of Fig. 2 showing the spring suspension mechanism; Fig. 4 is an enlarged transverse sectional view of the truck frame taken on line 4—4 of Fig. 1; Fig. 5 is a plan view of the front end of a truck frame with the idler unit removed; and Fig. 6 is a sectional view of the spring mechanism taken on line 6—6 of Fig. 3.

It will be understood that the supporting and driving mechanisms on both sides of the tractor are similar in construction, and therefore, a description of one will suffice for both. The main frame of the tractor includes side channel beams 10 and front transverse beams 11. A transmission housing casting 12 extends intermediate and is secured to the rear end of the side channels 10, and projects rearwardly therefrom. Suitable driving mechanism is provided within the housing for transmitting power from the engine to driving axles 13, which axles are carried by and project from the sides of the casting. A sprocket 14 is secured upon each driving axle for propelling an endless articulated track belt 15 located on each side of the main frame.

A truck frame 16 extends forwardly of and in longitudinal alignment with the sprocket 14, being spaced laterally from the main frame and extending adjacent to the forward end thereof. The rear end of the truck frame is pivotally mounted upon a shaft 17 which is secured to and extends from the side of the transmission housing in advance of and in a plane below the sprocket 14, and a nut 18 is screwed upon the end of the shaft to retain the truck frame upon its shaft. The truck frame is preferably formed as a single hollow casting having a flat bottom wall, and an open top which is closed by a removable cover plate 19 removably secured by studs along the sides.

The forward end of the truck frame is formed as a yoke terminating in spaced arms 20. A bracket 21 extends laterally from the side of the inner arm 20 beneath the side channel 10 of the main frame and provides a spring mounting, such bracket being preferably cast integral with the truck frame. A semi-elliptical leaf spring 22 extends longitudinally beneath the channel 10 and is seated upon the upper face of the bracket 21, being secured thereto by a central bolt, and by U bolts 23 which encircle the spring and extend through the bracket where they are secured by nuts 24. A hanger assembly depends from the channel beam 10 adjacent each end of the spring and the ends of the spring are slidable therein. Each hanger assembly consists of a filler block 25 which lies within the channel beam of the frame, and side plates 26 which are secured in spaced relation to the sides of the channel by rivets 27. One of the plates is formed with a spring bearing portion 28 having a curved lower face against which the spring slides. A pin 29 extends through the lower ends of the plates and is secured thereto by cotter pins 30. With this construction, the main frame is supported upon the truck frame, and the truck frame can move in a vertical plane about the pivotal connection with the shaft 17 without affecting the position of the main frame. The location of the spring under the channels of the main frame and the free movement of the ends of the springs permit relative movement of the frames in a vertical plane and serves to prevent any relative lateral side thrust.

A front idler sprocket unit assembly is adjustably secured upon the forward arms of the truck frame and can be readily adjusted and secured thereupon so that there can be no misalignment of the sprocket. The assembly includes a yoke shaped frame member having forwardly projecting arms 31, and an idler sprocket 32 which is positioned intermediate the arms 31 upon a transversely extending shaft 33 carried by bearings 34. The bearings 34 are removably secured to the bosses 35 at the forward ends of the yoke arms by bolts 36.

The arms of the idler frame are provided with longitudinal extending slots 37, and bolts 38 extend through apertures 39 in the arms of the truck frame and through the slots in the arms 31 of the idler frame. Nuts 40 are screwed upon the ends of the bolts 38 to clamp the idler frame securely with the truck frame. By loosening the nuts, the idler assembly can be adjusted longitudinally upon the truck frame to regulate the tautness of the endless belt. The idler assembly can thus be adjusted, or assembled upon and removed from the frame, as a unit. The size of the stationary bolts 38 being substantially the same diameter as the width of the slots 37 will guide the idler sprocket longitudinally during longitudinal adjustment and will assist in maintaining it in the same longitudinal relation in all positions upon the truck frame.

The rear end of the idler yoke frame terminates in a longitudinally split housing 41 which is provided with a threaded aperture into which an adjusting bolt 42 extends. A bolt 43 extends transversely through the split housing and is provided with a nut 44 by means of which the housing can be quickly clamped upon or released from the adjusting bolt. A bearing 45 is secured by studs 46 to the truck frame at the rear of the yoke frame and the adjusting nut is screwed through an aperture therein. By loosening the nut 44 the idler assembly can be readily adjusted longitudinally, or by clamping the split ends of the housing so that the bolt 42 can be screwed therein, the idler assembly can be adjusted by turning the bolt 42 in its bearing 45 and thus moving the idler assembly therewith, it being understood that in both instances the nuts 40 are loosened.

A plurality of roller assemblies are secured to the under side of the truck frame in spaced and longitudinally aligned relation. Each roller assembly is provided with a two section bearing 47 and 48 which carry a rotatable axle 49. The ends of the axle extend from the sides of the bearing, and roller sections 50 are secured thereupon by nuts 51 which are screwed upon the ends of the shaft. Suitable lock washers 52 are provided to prevent movement of the nuts upon the shaft, and to secure the roller sections so that the shaft will rotate therewith. Bolts 53 extend through the bearings and are screwed into the base of the truck frame to removably secure the roller asesmblies against the base of the truck frame. The roller sections are secured so that their exterior bearing faces at each side of the assemblies are in the same horizontal plane and in longitudinal alignment. The rollers bear upon the spaced longitudinally aligned rail faces 81 of the ground rim of the articulated endless track members. The roller sections of alternate assemblies are provided with outer flanges 48 which extend below the rail faces to maintain the track in proper relation with the rollers.

The rollers are of such size, and their adjacent axles are spaced apart so that the distance therebetween is less than the length of a track member. I prefer to space the adjacent axles apart a distance slightly greater than one half the longitudinal length of the rails of a track member, so that there will always be two rollers bearing on every other track unit and a single roller on the track units therebetween. With this arrangement the track members upon which two rollers bear will not move in a vertical plane, and the intermediate track members on which one roller bears, will also be held stationary by the roller at the adjacent end of the track members connected therewith. In this manner all of the track members are held by the rollers so that there will be no buckling at the joints in a vertical plane along the entire length of the ground run, and thus a continuous horizontal roller bearing surface will be maintained for the rollers. It will be seen that a horizontally maintained roller bearing surface will save wear on the tracks by eliminating crystallization which is caused by pounding of the tracks against the rollers when there is vertical buckling of the tracks.

The buckling action would otherwise be prevalent where a single central grouter 2 projects from the ground engaging face of each of the track links, as illustrated; such a grouter would, on hard surfaces, become a fulcrum of a lever and tilting about this fulcrum would result in accomplishing undesired buckling of the track.

The truck frame is provided on each side with a plurality of integrally formed outwardly extending bosses 54 to which brackets 55 are secured by studs 56. A guard plate 57 extends longitudinally on each side of the truck frame and is secured, adjacent the outer faces of the roller sections, to the brackets by studs 58. The guard plates extend slightly below the bearing face of the roller sections and are provided with holes 59 through which the axle ends project. These guards will prevent trash and other foreign matter from becoming entangled with the roller assembly axles and their bearings and with the bearings of the articulated track members.

Various changes can be made in the details of construction, shown and described, without departing from the spirit of my invention, and the scope of what is claimed.

What I claim is:—

1. In a supporting and propelling mechanism for track laying tractors, a rigid track frame, a plurality of roller bearing members journalled to said frame, said members having spaced bearing surfaces arranged in the same horizontal plane, an endless track formed of pivotally connected links encircling said frame and roller members, and providing an inner endless track upon which the bearing surfaces of said roller members rests, the distance between the journals of said rollers being greater than one-half the length of one of said links to prevent buckling of the ground run of said track, so that along the entire length of the ground run there is a roller engaging a link of the track member and each alternate link has at least two rollers in contact therewith.

2. In a supporting and propelling mechanism for track laying tractors, a rigid track frame, a plurality of roller bearing members journalled to said frame, said members having spaced bearing surfaces arranged in the same horizontal plane, an endless track formed of pivotally connected links encircling said frame and roller members, and providing an inner endless track upon which the bearing surfaces of said roller members rests, a central grouter being provided on each link, the distance between the journals of said rollers being greater than one-half the length of one of said links to prevent buckling of the ground run of said track, so that along the entire length of the ground run there is a roller engaging a link of the track member and each alternate link has at least two rollers in contact therewith when supported on the grouters.

In testimony whereof, I hereunto affix my signature.

ROLLIN H. WHITE.